Patented July 19, 1927.

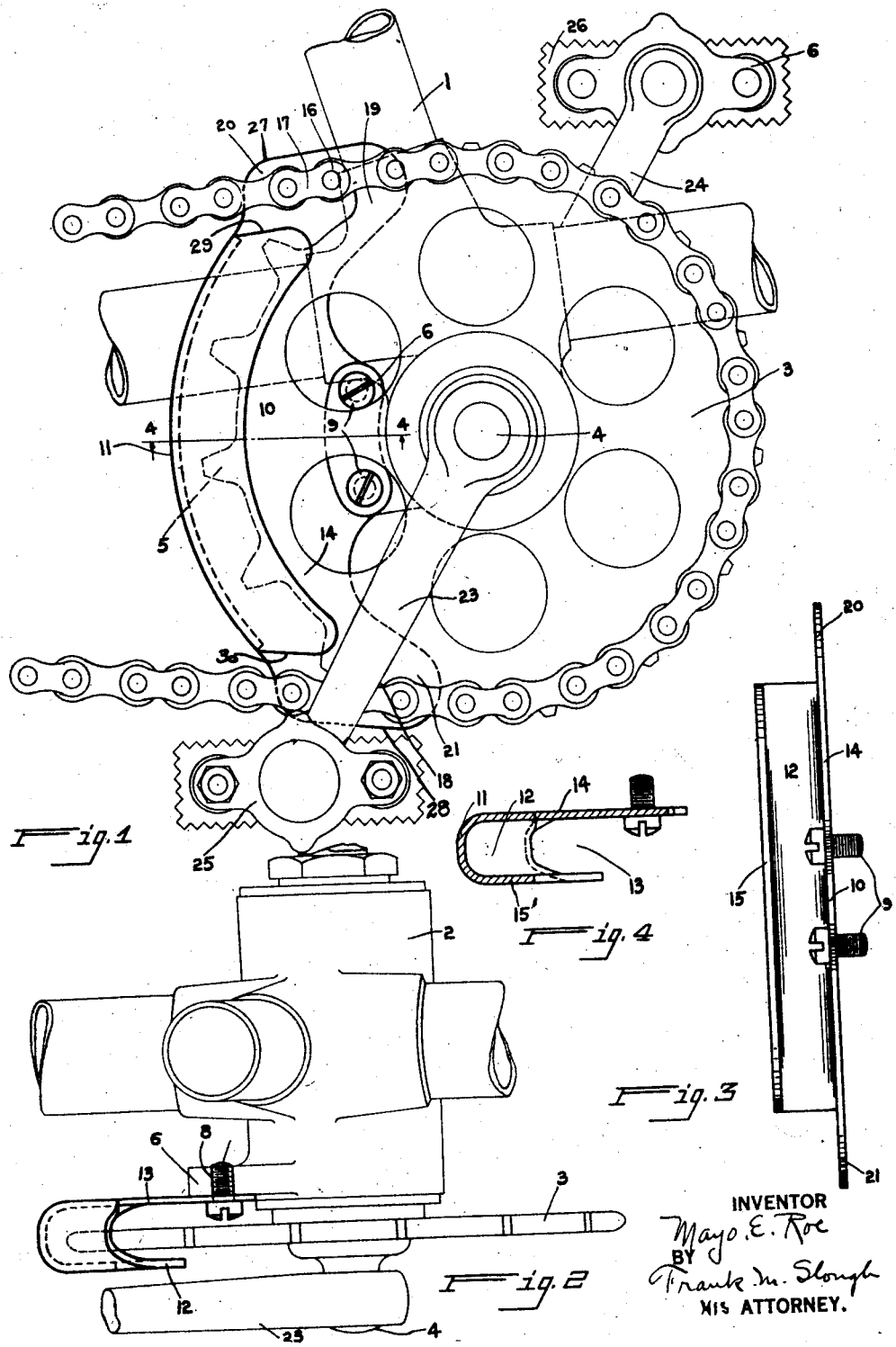

1,636,327

UNITED STATES PATENT OFFICE.

MAYO E. ROE, OF ELYRIA, OHIO, ASSIGNOR TO THE COLSON COMPANY, OF ELYRIA, OHIO, A CORPORATION OF OHIO.

CYCLE.

Application filed May 12, 1926. Serial No. 108,500.

My invention relates to improvements in cycles, and relates more particularly to improvements therefor intended for the purpose of preventing the catching of extraneous objects, such as the fingers of the individual manipulating the parts of the cycle from being caught between the propelling chain and sprocket thereof.

Heretofore various types of guards have been employed on bicycles for the sprocket wheel and sprocket chain and these guards have been so constructed and attached to the frame of bicycles in the effort, primarily to protect garments of a cycle rider from grease and dirt prevalent on the driving mechanism.

For instance, a common practice among cyclists, including children, is to lubricate the driving mechanism of a bicycle by inverting the bicycle and resting the same on its seat and handle bars and then rotating the sprocket wheel which in turn operates the sprocket chain and in then applying grease on the chain by holding a cloth, or the like, on the chain. Often the cloth will become entangled in the chain and draw the hand of the operator between the chain and wheel causing injury to the same. It is also well known that children will invert a bicycle in a like manner and turn the sprocket wheel in play, and accidentally fingers are caught in the sprocket chain wheel causing serious and painful injuries.

My invention has for an object the provision of a safety device so constructed and disposed as to prevent the fingers of anyone manipulating the propelling apparatus of the cycle, from being caught and injured between the sprocket chain and sprocket wheel.

Another object of my invention is to provide an improved guard which is simple in construction, economical to manufacture and easily and quickly attachable to a bicycle frame.

Other objects of my invention and the invention itself will be apparent from reference to the accompanying drawings wherein I have illustrated one of many embodiments of the same, and wherein:—

Fig. 1 shows a side elevation of an embodiment of my invention applied to a bicycle frame, only a fragment of the frame being shown;

Fig. 2 shows a top plan view of the same;

Fig. 3 shows an end elevation of the embodiments of Figs. 1 and 2 detached from the bicycle frame; and Fig. 4 shows a transverse sectional view of the same taken on the line 4—4 of Fig. 1.

Referring to all the figures of the drawings in all of which like reference characters designate like parts throughout the drawings, at 1, I show generally a fragment of a conventional bicycle frame having the usual sprocket wheel shaft bearing housing 2 adjacent the junction of the frame bars. A sprocket wheel 3 is secured to one end of a sprocket wheel shaft 4 journaled to rotate in the bearing housing in suitable ball bearings provided for the purpose, but not shown. The sprocket wheel periphery is provided with a plurality of sprocket teeth 5 which teeth are adapted to engage openings formed in the links 17 of a sprocket chain 16. Crank arms 23 and 24 are secured, one to each end of the shaft 4. The arm 24 extends to one side of the frame and the arm 23 extends to the outside of the sprocket wheel. Each crank arm is provided with means to rotatably support foot pedals 25 and 26 for propelling the bicycle.

An integral recessed flange 6 projects preferably rearwardly of the bearing housing 2, the recesses 8 formed therein being internally threaded to receive bolts or screws 9 for securing a finger guard, generally indicated by the reference numeral 10, to the bicycle frame disposed adjacent the sprocket wheel at the junction where the sprocket chain links are engaged by the teeth of the sprocket wheel in operation.

My improved finger guard 10 preferably comprises a single sheet of pressed steel stamped or cut out of the same by cutting dies or in any other well known manner to form a substantially curved plate throughout. The plate is reversely turned at 11 to form an arcuate channel 12 by virtue of main body portion 14 and the outer flange 15 resulting from the reverse turn in the main body portion at 11. When the guard is applied to a bicycle frame the channel 12 is disposed adjacent and on a vertical plane parallel with the axis of rotation of the sprocket wheel, thereby providing a shield for the teeth thereof which are free of the links 17 of the chain 16. The outer flange 15 extends upwardly and downwardly near to the point where the chain links are engaged by the teeth of the sprocket wheel, at 18 and 19.

The main body portion 14 is curved at all portions and is of a greater size than the flange 15 and is provided with upper and lower extension portions 20 and 21, respectively, which are adapted to extend adjacent the points 18 and 19 and on opposite sides of the sprocket chain and sprocket wheel from the flange 15.

The outer edges 27 and 28 of the main body extensions 20 and 21, and the outer edges 29 and 30 of the flange 15 are disposed parallel to the chain 16 as it passes onto and off of the sprocket wheel 3. This relative positioning of the parts is an important feature of my invention and results in reducing the possibility of persons fingers being caught and injured between the sprocket wheel and sprocket chain.

A finger guard constructed in the manner set forth and mounted on a bicycle frame as heretofore illustrated and described so places the arcuate channel 12 so as it partially surrounds the sprocket wheel 3.

The guard may be made of varying sizes for attachment to bicycles and sprocket wheels of varying sizes and preferably formed of a single piece of metal, so that it does not materially add to the weight of the bicycle, and it may be nickel-plated or enameled to conform to the finish of the bicycle to which it is attached.

Having thus described my invention in a single embodiment, I do not wish to limit myself to the specific embodiment herein illustrated and described, as I am aware that numerous and extensive departures may be made from the same but without departing from the spirit of my invention.

I claim:—

1. A safety device for cycles adapted to prevent extraneous objects from being drawn between the propelling cycle sprocket and its chain during rotation of the sprocket, comprising a one piece guard having a flattened centrally disposed portion adapted to secure the guard to the frame on the inner side of the sprocket and having a portion overlying the periphery of the sprocket and extending from points closely adjacent the leaving and advancing chain portions with the sprocket.

2. A safety device for cycles adapted to prevent extraneous objects from being drawn between the cycle sprocket and its chain during rotation of the sprocket, comprising a guard secured to the frame on the inner side of the sprocket and having a portion overlying the periphery of the sprocket free of the chain and extending from points closely adjacent the leaving and advancing chain portions with the sprocket, said overlying guard portion being curved substantially concentrically with the sprocket and enclosing only the sprocket teeth free of contact with the chain.

3. A safety device for cycles adapted to prevent extraneous objects from being drawn between the cycle sprocket and its chain during rotation of the sprocket, comprising a guard secured to the frame on the inner side of the sprocket and having a portion overlying the periphery of the sprocket and extending from points closely adjacent the leaving and advancing chain portions with the sprocket, said overlying guard portion being curved substantially concentrically with the sprocket, and comprising a flange extending from said overlying portion and over the adjacent peripheral portions of the sprocket on its outer side.

4. In a bicycle, the combination with a sprocket and a sprocket chain, a bearing housing for the sprocket, an apertured lug extending from the housing, of a guard adapted to prevent extraneous objects from being drawn between the sprocket and its chain during rotation of the sprocket, said guard having an apertured central portion adapted to receive bolts for securing the guard to the lug on the inner side of the sprocket and having a portion overlying the periphery of the sprocket adjacent the leaving and advancing chain portions with the sprocket.

In testimony whereof I hereunto affix my signature this 28th day of April, 1926.

MAYO E. ROE.